US012476352B1

(12) United States Patent
Smith et al.

(10) Patent No.: US 12,476,352 B1
(45) Date of Patent: Nov. 18, 2025

(54) SYSTEM AND METHOD FOR PROVIDING INTEGRATED ANTENNA

(71) Applicant: Textron Innovations Inc., Providence, RI (US)

(72) Inventors: Gavin Thomas Smith, Wichita, KS (US); William Dale George, Andover, KS (US); Rajendra Nidal, Wichita, KS (US); Nick Andrew Rico, Mulvane, KS (US); Richard Andrew Olson, Derby, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 71 days.

(21) Appl. No.: 18/507,911

(22) Filed: Nov. 13, 2023

(51) Int. Cl.
*H01Q 1/28* (2006.01)
*H01Q 1/22* (2006.01)

(52) U.S. Cl.
CPC ................ *H01Q 1/28* (2013.01); *H01Q 1/22* (2013.01)

(58) Field of Classification Search
CPC ............... H01Q 1/28; H01Q 1/22; H01Q 1/12
USPC ........................................................ 343/705
See application file for complete search history.

(56) References Cited

U.S. PATENT DOCUMENTS

| | | | | |
|---|---|---|---|---|
| 9,614,272 B2 * | 4/2017 | Wallace | H01Q 1/12 |
| 2015/0207214 A1 * | 7/2015 | Wallace | H01Q 1/12 343/705 |
| 2017/0373383 A1 * | 12/2017 | Baron | H01Q 1/50 |
| 2018/0351243 A1 * | 12/2018 | Lewis | H01Q 1/282 |
| 2020/0381815 A1 * | 12/2020 | Milroy | H01Q 1/125 |

FOREIGN PATENT DOCUMENTS

| | | | |
|---|---|---|---|
| CN | 217501341 U * | 9/2022 | |
| CN | 116266665 A * | 6/2023 | B64C 1/36 |
| EP | 2790267 A1 * | 10/2014 | H01Q 1/12 |

* cited by examiner

*Primary Examiner* — Steven S Paik
(74) *Attorney, Agent, or Firm* — SLATER MATSIL, LLP

(57) ABSTRACT

A method for providing an integrated antenna for an aircraft includes identifying a target antenna for an aircraft, identifying a target interior antenna location in the aircraft according to the target antenna, verifying antenna operation, at the target interior antenna location, of the target antenna, mounting the target antenna to a mounting plate, providing a replacement radio transmissive panel (RTP), and attaching the replacement RTP to the aircraft with an exterior surface of the replacement RTP substantially maintaining an outer mold line (OML) of the aircraft, the replacement RTP at least partially covering the target antenna and the mounting plate after the mounting plate is affixed to the aircraft in an antenna cavity associated with the target interior antenna location and after the target antenna is mounted to the mounting plate.

20 Claims, 14 Drawing Sheets

SYSTEM AND METHOD FOR PROVIDING INTEGRATED ANTENNA

TECHNICAL FIELD

The present invention relates generally to a system and method for providing an integrated antenna for a vehicle, and in particular embodiments, to a system and method for modifying antenna arrangements on a vehicle.

BACKGROUND

Generally, vehicle, and aircraft in particular, has numerous transmitting and receiving antennas disposed on the outside of the vehicle for features such as communication, weather radar, navigation, environment monitoring, and the like. Traditional externally mounted aerodynamic antennas are difficult to change rapidly as equipment requirements change, increase drag, and reveal details of systems onboard. Additionally, for aircraft in particular, the placement of each antenna on the external surface of the aircraft requires review and certification of the outer mold line (OML), or outer surface of the aircraft to verify that attachments such as the antennas do not interfere with operation of the aircraft. Additionally, changing or moving the antennas to update the antennas, change the communications systems, move the antenna to accommodate repairs or additional antennas, or the like, requires recertification of the OML.

Bubbles, or flared body sections, may be used to cover existing antennas may be used, these bubbles are on the outside of the vehicle skin, and may require separate certification. Conformal antennas that are formed on the outer surface of the vehicle, are low profile, providing low drag and little indication of the type of system using the antenna, are expensive, as they must be specifically engineered for each system and deployment, and must be redesigned and recertified when system requirements change.

SUMMARY

An embodiment method includes identifying a target interior antenna location in an aircraft having a first outer mold line (OML) formed by an exterior skin, verifying antenna operation, at the target interior antenna location, of a target antenna, providing a mounting plate configured to accept mounting of the target antenna, mounting the target antenna to the mounting plate, providing a replacement radio transmissive panel (RTP), wherein the replacement RTP has a first outer surface that substantially conforms to a second outer surface of an exterior panel of the exterior skin, and attaching the replacement RTP to the aircraft with the first outer surface forming a second OML with a portion of the exterior skin, wherein the second OML is substantially the same as the first OML.

An embodiment method includes identifying a target antenna for an aircraft, identifying a target interior antenna location in the aircraft according to the target antenna, verifying antenna operation, at the target interior antenna location, of the target antenna, mounting the target antenna to a mounting plate, providing a replacement radio transmissive panel (RTP), and attaching the replacement RTP to the aircraft with an exterior surface of the replacement RTP substantially maintaining an outer mold line (OML) of the aircraft, the replacement RTP at least partially covering the target antenna and the mounting plate after the mounting plate is affixed to the aircraft in an antenna cavity associated with the target interior antenna location and after the target antenna is mounted to the mounting plate.

An embodiment apparatus includes a mounting plate affixed in an antenna cavity of an aircraft, where the mounting plate is connected to at least two supports of the aircraft, and is recessed from an exterior skin of the aircraft, a first antenna disposed in the antenna cavity and removably mounted to the mounting plate, and a replacement radio transmissive panel (RTP), where the replacement RTP includes one or more composite layers, where each composite layer of the one or more composite layers is a radio-transmissive material, where the replacement RTP is attached to the aircraft with an first outer surface of the replacement RTP substantially conforms to a second outer surface of the exterior skin of the aircraft, where at least a portion of the exterior skin of the aircraft adjacent to the replacement RTP includes a material that is non-transmissive to radio, where the replacement RTP at least partially encloses the antenna cavity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In order to maintain an outer mold line (OML) of a vehicle, the outer skin or aerodynamic shell of the vehicle must be maintained to avoid the need to testing and certification each time an antenna is added to the exterior of the vehicle. Covering an exterior antenna with a blister or other supplemental skin or covering modifies the OML, requiring testing and certification. However, antennas may be moved within the regular aerodynamic shell of a vehicle to maintain the OML. Thus, a vehicle may advantageously be modified by moving an antenna within a skin or structure providing an OML, and may be provided with a radio transmissive panel so that radiation to or from the antenna passes through the radio transmissive panel. The modification of an aircraft to move antennas to an interior location provides the ability to update or modify antennas without requiring re-certification of the OML or aerodynamic shell when an antenna is moved, in addition to providing security and privacy regarding the antennas and associated electronic equipment installed within an aircraft.

Figure 1:
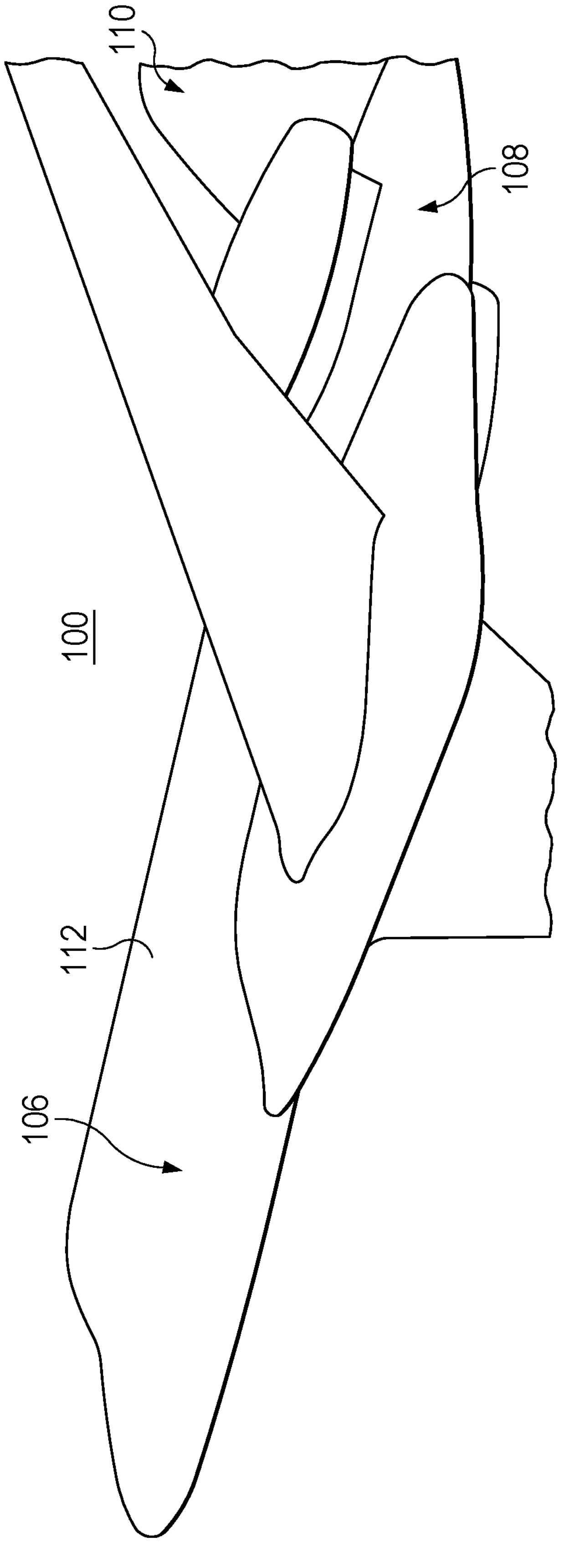
FIG. 1 is a perspective view of an aircraft with radio transmissive panel regions according to some embodiments.

FIG. 1 is a perspective view of an aircraft 100 with radio transmissive panel (RTP) regions 106, 108, 110 according to some embodiments. One or more panels of, for example, a fairing, body 112, or the like, may be replaced with RTPs to permit antennas to be mounted behind the RTPs 102 without interfering with transmission by the antenna. For example, skin panels forming the OML of the aircraft may normally be aluminum, titanium, or another metal, or a composite like carbon fiber, or the like, all of which are nontransparent to radio transmission. These skin panels may be replaced by RTPs formed from fiberglass, a ceramic-based composite such as quartz glass, an aramid such as Kevlar®, nylon, or the like, to provide a radio transparent covering that maintains the OML of the aircraft 100. Additionally, the RTPs may be provided in various in parts of the body 112 to provide interior antenna locations. For example, underbody portions 106 of the aircraft, body side portions 108 of the aircraft or stabilizer tip sections 110 of the aircraft may have RTPs 102 that cover respective installation locations for interior mounted antennas.

Figure 2A:
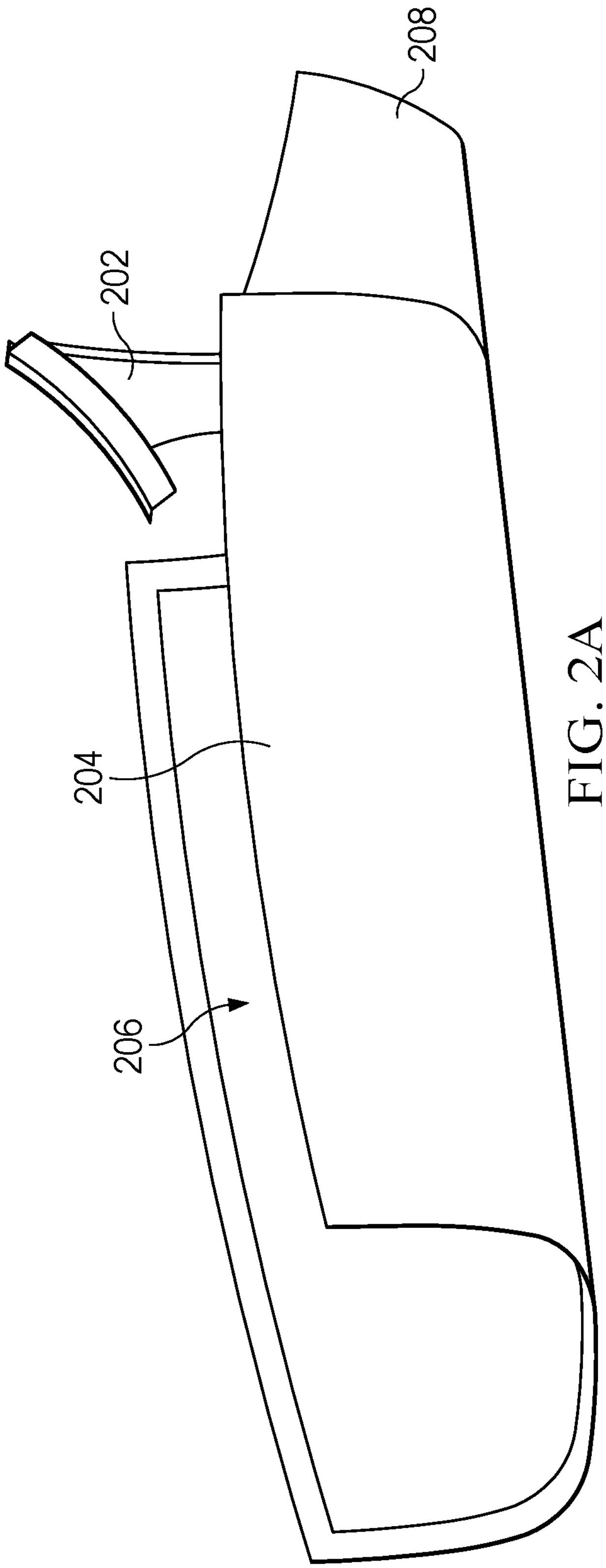
FIG. 2A-2E are perspective views of an underbody interior antenna installation arrangement according to some embodiments.

FIG. 2A-2E are perspective views of an underbody interior antenna installation arrangement 200 according to some embodiments. FIG. 2A is a perspective view of an underbody RTP 204 installed in an underbody location according to some embodiments. The underbody RTP 204 may at least partially bound an underbody antenna cavity 206 so that antennas may be enclosed on at least 3 sides by the underbody RTP 204. Additionally, panels such as a secondary RTP 208 may be provided to cover a portion of an underbody antenna installation. The underbody RTP 204 and secondary RTP 208 may be attached to a bulkhead, support 202, or the like.

In some embodiments, the RTPs are formed from a radio transparent composite such as fiberglass, an aramid such as Kevlar®, a ceramic based composite such as quartz glass, or the like. Sheets of the composite may be formed around a stiffening element to form a stiffened region to resists flexing or deformation during use. Using a radio transparent stiffening element avoids the use of metal longerons, braces, ribs, stiffeners or the like on the body of the RTP, as the metal bracing elements may reduce the range of antennas.

Additionally, in some embodiments, the edges may be formed without a stiffening element so that the RTP has an edge that is about the same thickness and contour as the original non-transmissive panel. This permits the RTP to attach to a standard mounting point without needing modification of the mounting point, and further permits substitution of the RTP for a standard non-transmissive panel. Additionally, the RTP may be primarily secured at the edges of the RTP to avoid requiring metal supports or metal fasteners for attachment in the main body of the RTP, which may interfere with, or reduce the range of, transmission by an interior antenna.

Figure 2B:
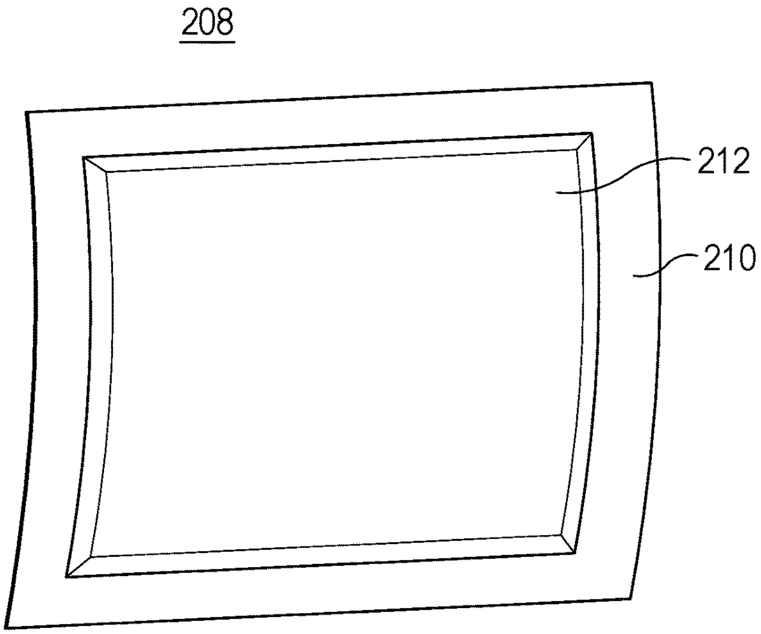
Figure 2C:
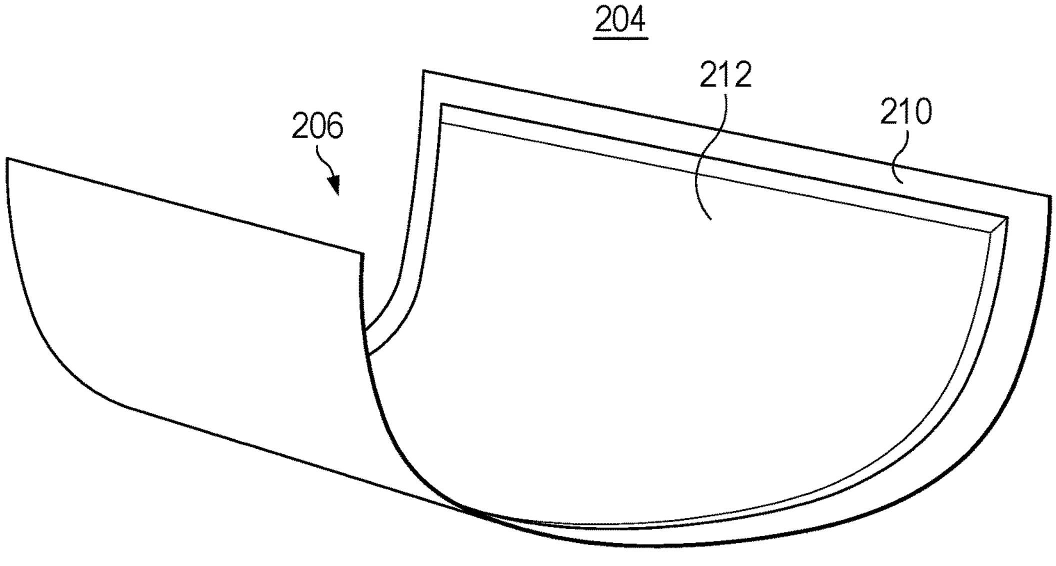

FIG. 2B is a view of an interior surface of a secondary RTP 208 according to some embodiments. FIG. 2C is a view of a portion of an interior surface of an underbody RTP 204 according to some embodiments. Both the underbody RTP 204 and the secondary RTP 208 may have an edge portion 210 bounding a body portion 212. In some embodiments, the edge portion 210 may be formed from one or more layers of composite material. In some embodiments, the body portion 212 may comprise a radio transmissive stiffening element such as a Nomex® panel, foam panel, honeycomb material, one or more additional composite layers, or the like. For example, a one-quarter inch, or even a 0.190 inch, Nomex® panel may be used as a stiffener or filler for a body portion 212 of the RTP panel. This may result in the body portion 212 being thicker than the edge portion 210. The body portion 212 may be formed by attaching the stiffening element to one or more composite layers, or by laminating the stiffening element between multiple composite layers. One or more attachment support elements, such as frame, plate, washers, brackets, or the like, may be disposed in the edge portion to provide additional support for fastening the RTPs 204, 208 to a mounting element on the aircraft. For example, in some elements, a metal plate or frame with holes configured to accept rivets, screws, bolts, or other fasteners, may be disposed in, or on, the edge portion 210 to prevent wear by the fasteners in the holes, and to prevent distortion of the RTPs 204, 208 at the fasteners. The fasteners may pass though the RTP 204, 208, through any existing attachment support element, and into a mounting element of an aircraft to attach the respective RTP 204, 208 to the aircraft. In other embodiments, the RTPs 204, 208 may be adhesively attached to the aircraft.

Figure 2D:
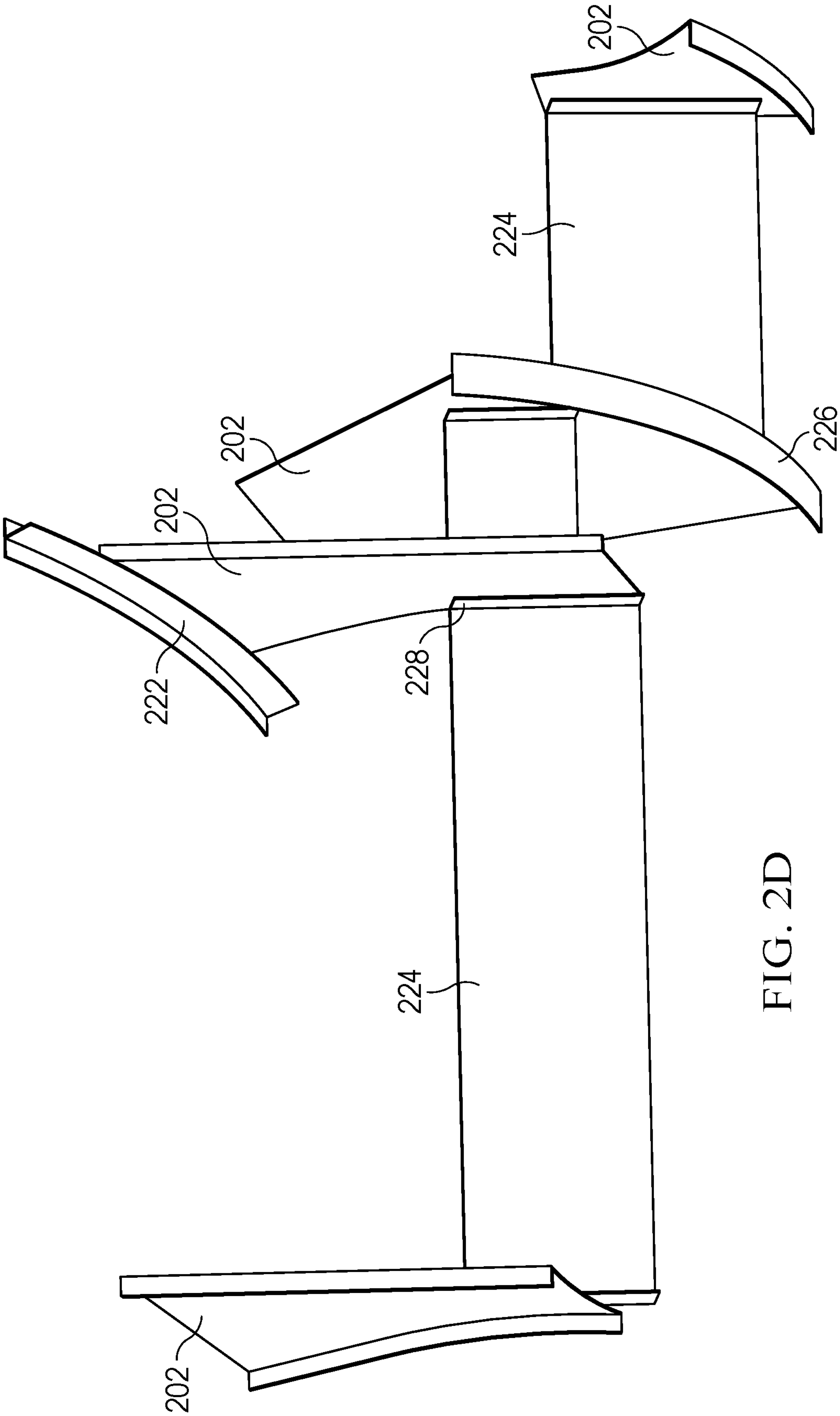
Figure 2E:
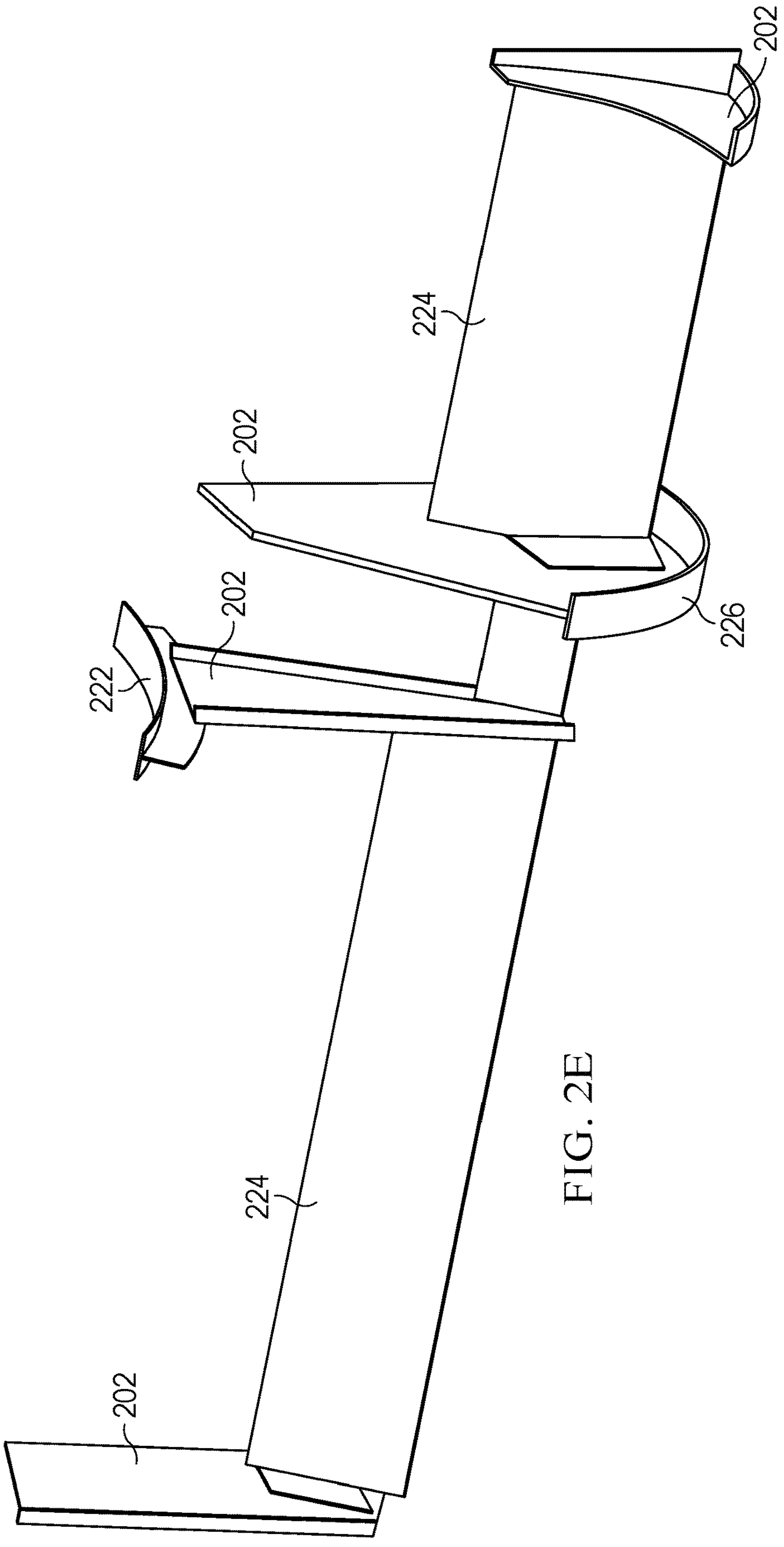

FIG. 2D-2E are perspective views of an underbody installation location 220 according to some embodiments. In some embodiments, when an underbody RTP and secondary RTP are removed, one or more mounting plates 224 are accessible. The mounting plates 224 are configured for attachment of one or more antennas. In some embodiments, the mounting plates 224 are removable or replaceable, so that antennas may be switched out by changing the mounting plate to which the new antenna is attached. In other embodiments, the mounting plate 224 may have multiple antennas mounted thereon, and the antennas may be upgraded, switched, or otherwise changed by removing a selected antenna from an installed mounting plate 224.

In some embodiments, a mounting plate 224 is attached to one or more supports 202. The supports 202 may be brackets, braces, bulkheads, or other structures. For example, the supports 202 may be structures that are attached to a rib 222, or other structural member of an aircraft within the aircraft interior. Additionally, the supports 202 may have a support flange 226, or the like, that provides a mating or mounting surface for accepting attachment of, and providing support to, the RTPs or other exterior elements such as non-RTP exterior panels or skins. In some embodiments, the supports 202 may be permanently installed, for example, by rivets or adhesives, or may be regular fixtures or structural members of the aircraft. In other embodiments, the supports 202 may be placed specifically for supporting the mounting plates 224, and may be temporarily attached by, for example, screws, bolts, or other removable fasteners. The supports may be substantially out of the transmission area used by an antenna mounted on the mounting plate, and thus may be formed from aluminum, titanium, or another metal or alloy, or another material such as carbon fiber, or the like, where the radio transmissiveness is not a factor since the support 202 will not affect transmissions by the antennas.

The mounting plates 224 may be removably or permanently mounted between supports 202. In some embodiments, the mounting plates 224 may have a flange 228 or other feature providing a surface for fasteners to attach the mounting plate 224 to the support 202. In some embodiments, antennas may be mounted directly to the mounting plate 224, or the mounting plate 224 may have removable sections or sub-plates to which an antenna is mounted. In such an arrangement, the bulk of the mounting plate 224 is kept in place while the removable sections or sub-plates are removed, with an attached antenna, to permit switching antennas. In other embodiments, the mounting plate 224 may be removable, so that one or more antennas may be removed by removing the mounting plate 224 itself. This permits service of the antennas, or switching of antenna setups by providing a different mounting plate 224 with different antennas, or permitting access to the antennas for upgrades, switching of the antennas, or other service.

Figure 3A:
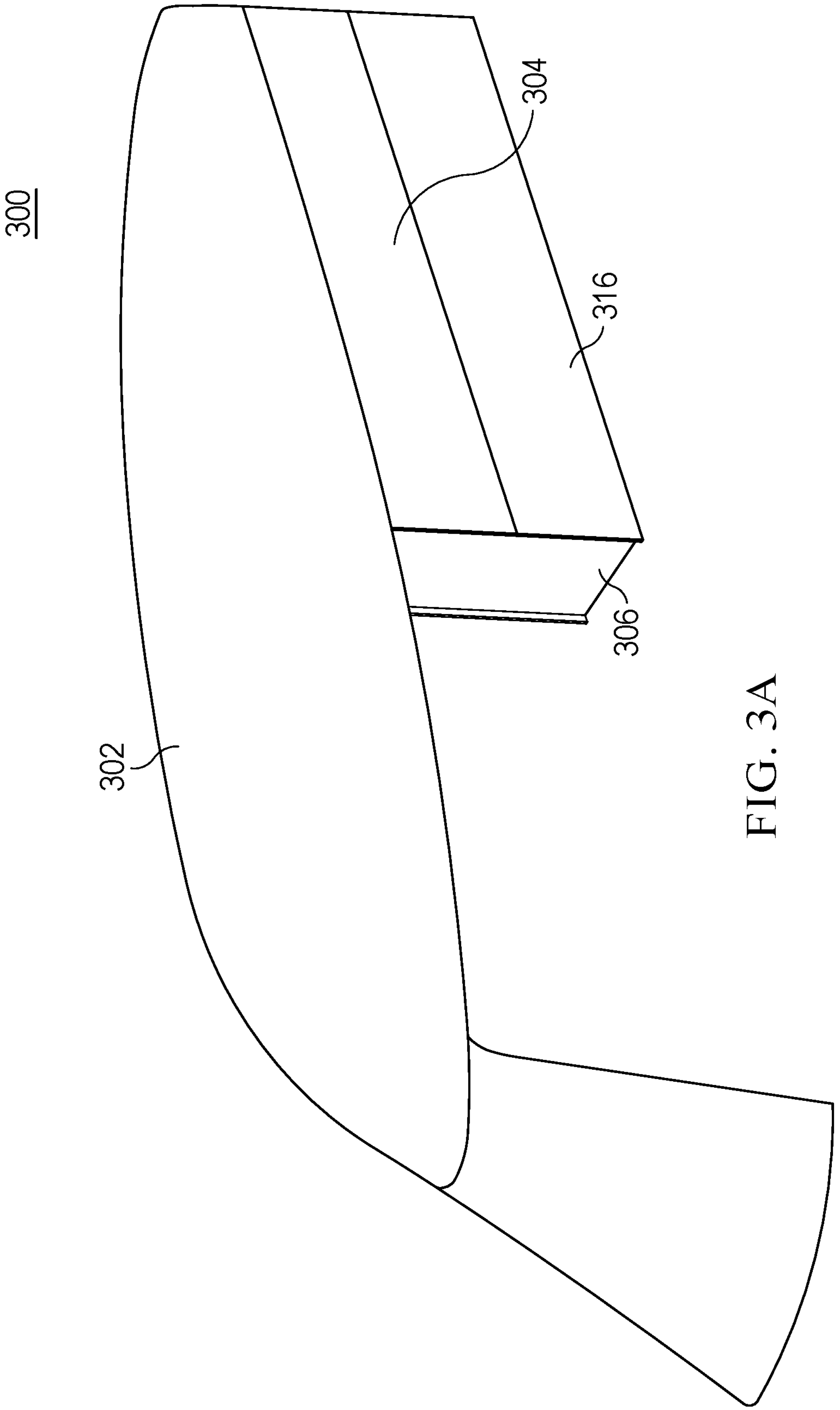
FIG. 3A-3E are perspective views of a stabilizer tip interior antenna installation arrangement according to some embodiments.

FIG. 3A-3E are perspective views of a stabilizer tip interior antenna installation arrangement according to some embodiments. FIG. 3A is a perspective view of an aircraft stabilizer structure 300 with a stabilizer cap RTP 302 according to some embodiments. Exterior element, such as vertical stabilizers, horizontal stabilizers, tail cones, canards, wingtips, or the like, may have views or transmission regions that are largely unobstructed by, for example, a body of an aircraft, propulsion elements such as engine nacelles, rotors, or the like. Thus, those exterior elements may provide advantageous locations for mounting antennas, and for mounting omnidirectional or nonfixed direction antennas. In the disclosed and nonlimiting embodiments, a vertical stabilizer has a stabilizer cap RTP 302 made from a radio transmissive material, and that encloses a mounting plate and one or more mounted antennas. The stabilizer cap RTP 302 may have an exterior surface that conforms to one or more exterior elements, such as a first stabilizer side RTP 304 or another exterior panel, to provide a seamless OML. The stabilizer cap RTP 302 may be attached to one or more supports 306, or to a mounting plate or other support element. The stabilizer cap RTP 302 may be formed to substantially enclose a stabilizer antenna cavity. For example, in some embodiments, the stabilizer cap RTP 302 may have sidewalls that join to form a top surface, and that join each other at a leading edge to enclose the front, sides and top of the stabilizer antenna cavity. In some embodiments, the stabilizer structure 300 may also have a lower stabilizer RTP 316 that bounds a lower portion of the stabilizer antenna cavity.

Figure 3B:
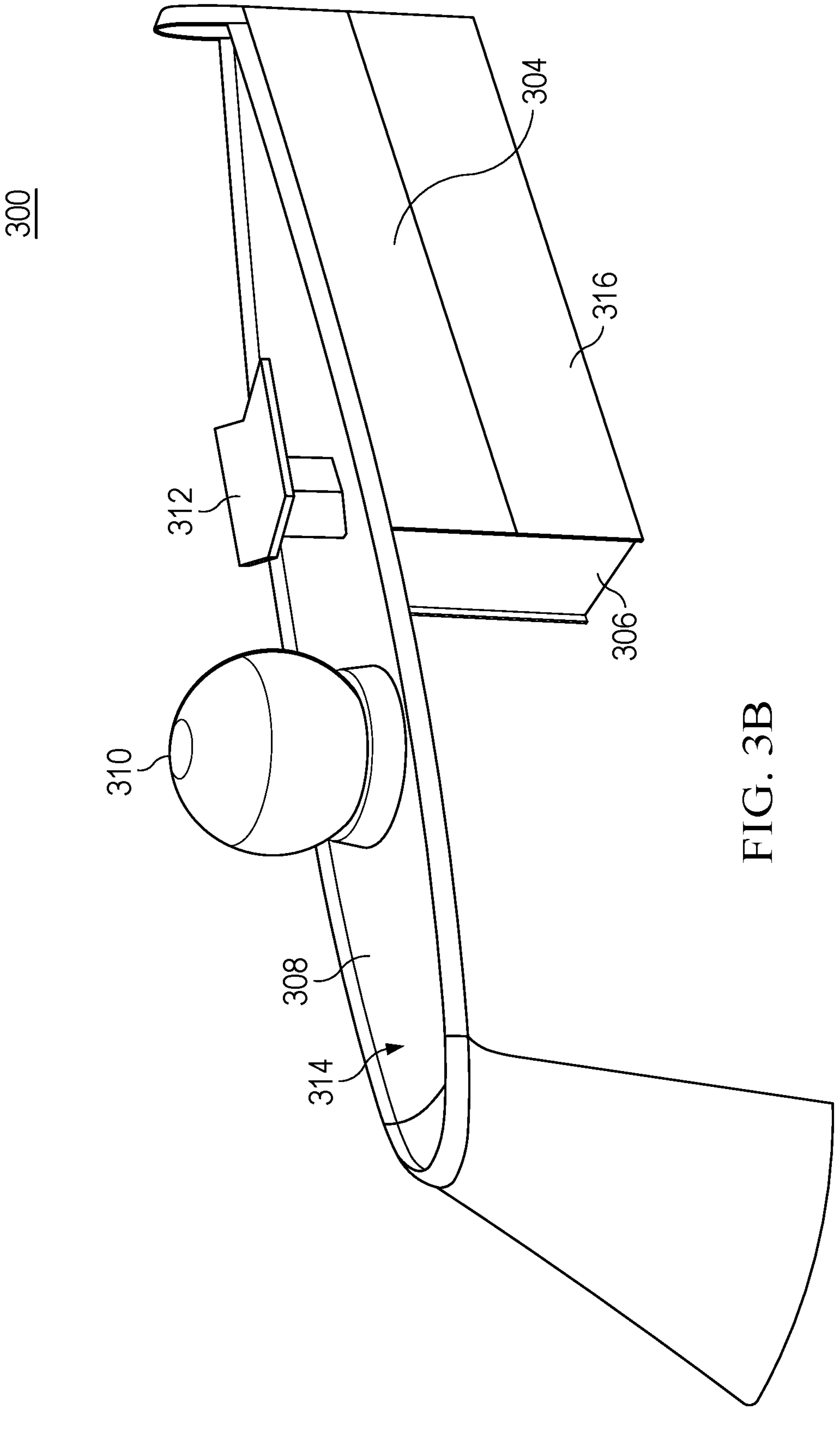

FIG. 3B is a perspective view of an aircraft stabilizer structure 300 illustrating the stabilizer antenna cavity 314 and mounting plate 308 according to some embodiments. One or more antennas 310, 312 may be mounted on the mounting plate 308 so that the antennas 310, 312 extend into the portion of the stabilizer antenna cavity 314 bounded by the stabilizer cap RTP 302, when installed. In some embodiments, the antennas 310, 312 mounted on the mounting plate 308 may include non-aerodynamic antennas or enclosed antennas, such as the first antenna 310. Additionally, the antennas 310, 312 may include an exterior antenna 312 or aerodynamic antenna that would normally be mounted on the exterior of the aircraft. Thus, an antenna 312 with an exterior protective surface may be mounted in an internal cavity of the aircraft. Mounting the antennas 310, 312 on the mounting plate 308 to be covered by the stabilizer cap RTP 302 permits any type of antenna to be mounted on the aircraft since the stabilizer cap RTP 302, or any other RTP, may be sized to provide space for an antenna that has an aerodynamic shell, and to provide protection for non-aerodynamic antennas. Additionally, the disclosed embodiment illustrates that the antennas 310, 312 may be disposed behind an RTP so that the antennas 310, 312 are removed from the aerodynamic envelope, improving aero performance, but also allowing change of the antennas without modifying the OML and requiring re-certification of the OML when an antenna is changed. Furthermore, placing the antennas 310, 312 behind an RTP such as the stabilizer cap RTP 302 provides increased security and privacy since third parties are not alerted, by the antennas, to the type of potentially expensive equipment that may be on the aircraft.

Figure 3C:
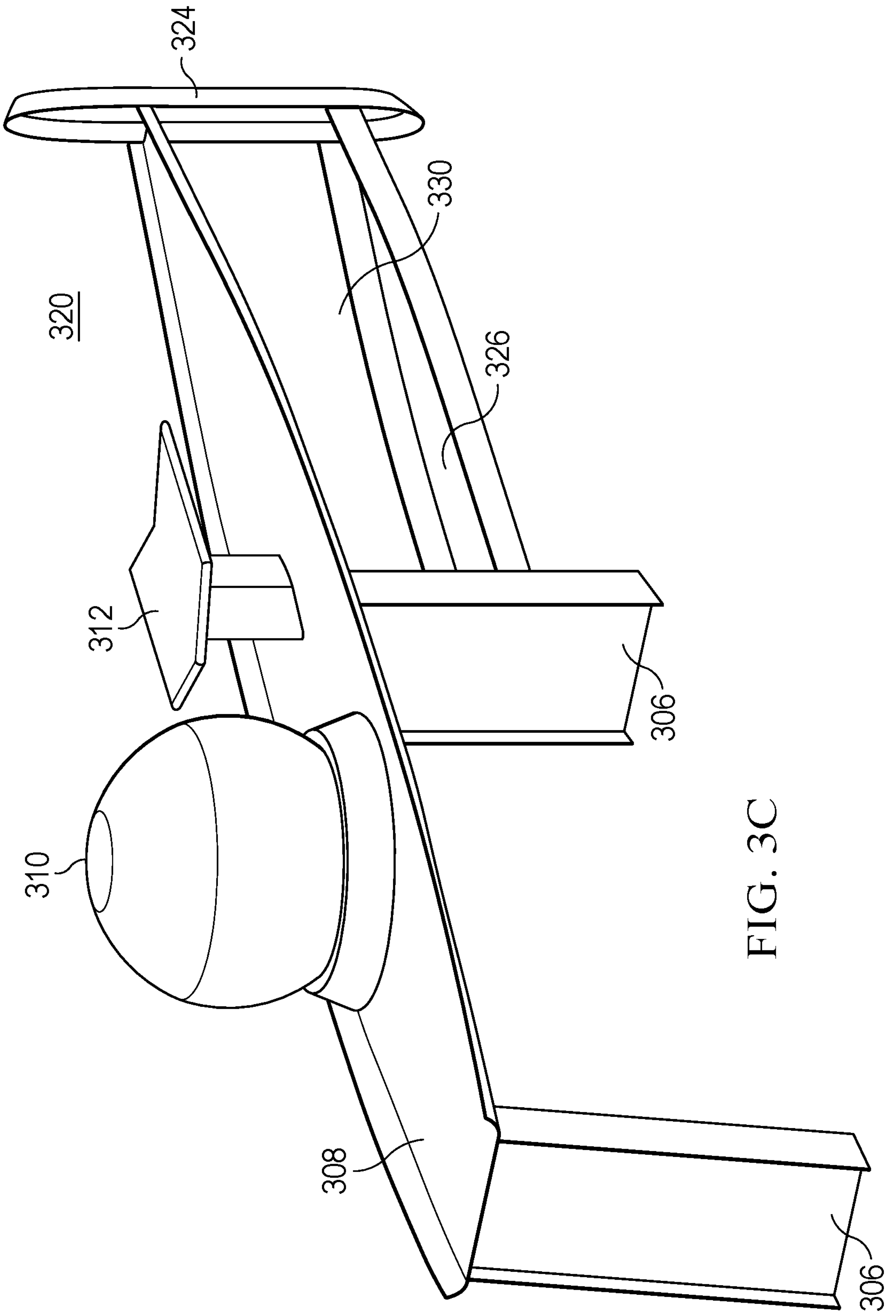
Figure 3D:
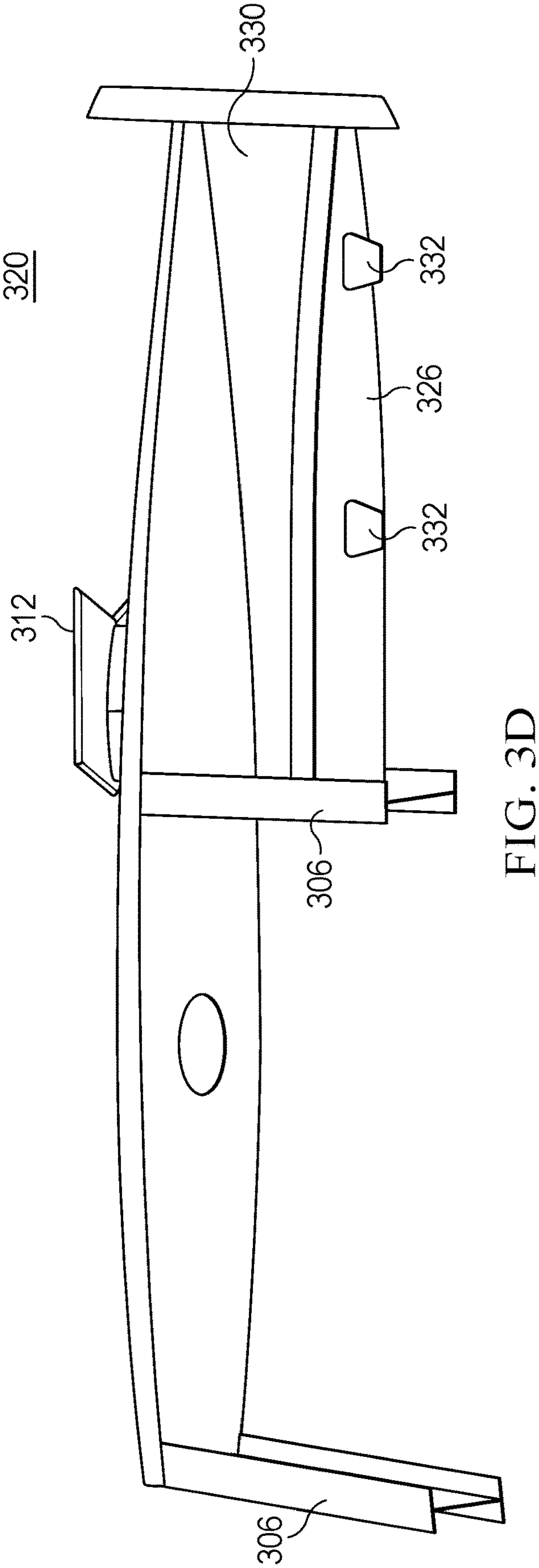

FIGS. 3C-3D are perspective views of an aircraft stabilizer structure interior 320 illustrating the stabilizer antenna cavity 314 and mounting plate 308 according to some embodiments. When the first stabilizer side RTP 304 and lower stabilizer RTP 316 are removed, the interior of the vertical stabilizer may be accessible, and may expose a secondary mounting plate 326. A second stabilizer side RTP 330 may be disposed opposite the secondary mounting plate 326 from the first stabilizer mounting plate 308. The first and second stabilizer side RTPs 304, 330 may be formed from radio transparent materials to permit mounting of antennas on the secondary mounting plate 326. Additionally, any, or all, of the stabilizer RTPS 302, 304, 316, 330 may be formed with edge portions and body portions as discussed above.

In some embodiments, additional antennas 332 may be mounted on the bottom of the mounting plate 308 or secondary mounting plate 326. Third antennas 332 may be mounted on the bottom of the secondary mounting plate 326. For example, the third antennas 332 may be blade antennas for telemetry, data links, or ground-based communication. Additionally, the first antenna 310 may be a satellite communications antenna, and the second antenna 312 may be a satellite or other communications antenna. Additionally, one or more additional antennas, such as may be mounted on the bottom of the mounting plate 308 opposite the first antenna 310 and second antenna 312. In some embodiments, any of the antennas may be an antenna, or a communication unit with an antenna, for inertial navigation, a satellite-based positioning system such as a global positioning system (GPS) receiver, or the like. Thus, various types of antennas may be disposed in the stabilizer antenna cavity.

In some embodiments, the mounting plate 308 and secondary mounting plate 326 may be attached to one or more supports 306, 324. The supports 306, 324 may be structural members forming the structure of the stabilizer, and may run substantially perpendicular to the mounting plate 308 and secondary mounting plate 326. However, it should be understood that the supports 306, 324 may run at any angle to the mounting plate 308 and secondary mounting plate 326 while providing spacing between the mounting plate 308 and secondary mounting plate 326. Additionally, the supports 306, 324 may be internal or external supports. For example, the first supports 306 may be internal supports that are completely enclosed by the aircraft skin and RTPs, while the second support 324 may be a fairing or edge piece, such as a trailing edge fairing element that is at least partially exposed when the aircraft skin and RTPs are installed. In some embodiments, the second support 324 may have a flange, or the like, to which the RTPs may be attached to partially cover the second support 324. The first supports 306 may have an edge portion or edge flange to which the RTPs attach and completely cover.

Figure 3E:
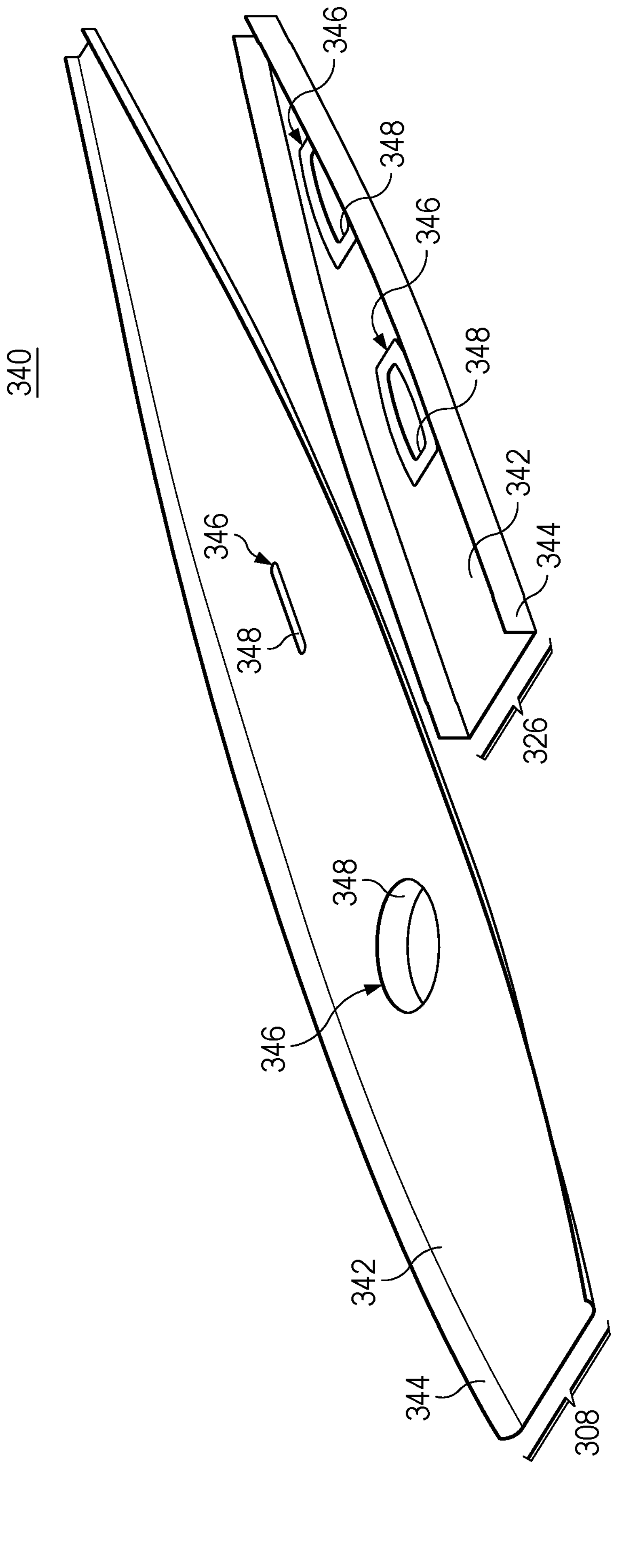

FIG. 3E is a perspective view of a mounting plate arrangement 340 showing specifics of the mounting plate 308 and secondary mounting plate 326 according to some embodiments. The mounting plate 308 and secondary mounting plate 326 each have a plate body 342 that provide one or more antenna mounting areas 346. Each mounting area 346 may have one or more wiring openings 348 for connecting physical electrical or communication wiring through the respective mounting plate 308, 326. Since the mounted antennas may be external antennas that are relocated to an internal antenna cavity, the antennas may have wiring that extends from the bottom or mounting side of the antenna, through the aircraft skin. The wiring openings 348 providing an opening for the wiring to pass through the mounting plate 308 or secondary mounting plate 326 without requiring modification of the antenna. The body 342 may further have one or more supplemental openings for reducing weight, providing attachment points for additional elements, or permitting wiring of other elements such as lights, external or conformal antennas, or the like.

In some embodiments, one or both of the mounting plate 308 or the secondary mounting plate 326 are modular, having a removable sub-plate that attaches to the mounting plate 308 or secondary mounting plate 326 in the relevant antenna mounting area 346. This permits antennas to be removed without removing the mounting plate 308 or secondary mounting plate 326. In other embodiments, the mounting plate 308 or secondary mounting plate 326, with the mounting plate 308 or secondary mounting plate 326 removably attached to the supports 306, 324 by, for example, removable fasteners such as bolts, screws, or the like.

The body 342 of the mounting plate 308 or secondary mounting plate 326 may have one or more stiffeners, or the like, to provide structural support for the body 342. The body 342 of each plate may further have one or more edge flanges 344 that provide a location for attaching RTPs or exterior skins, and that provide additional stiffening or support for the body 342.

Figure 4A:
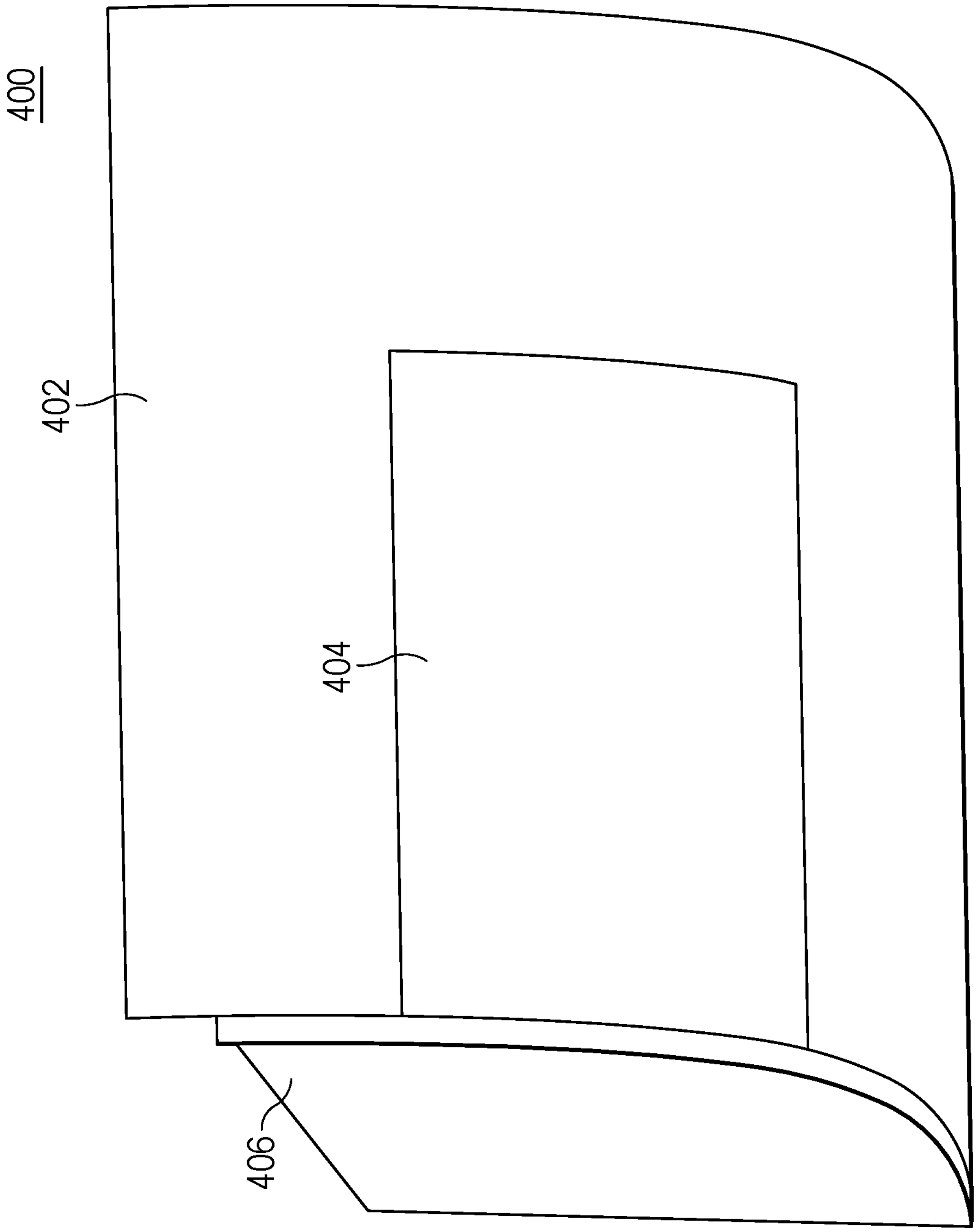
FIG. 4A-4C are perspective views of a body side interior antenna installation arrangement according to some embodiments.
Figure 4B:
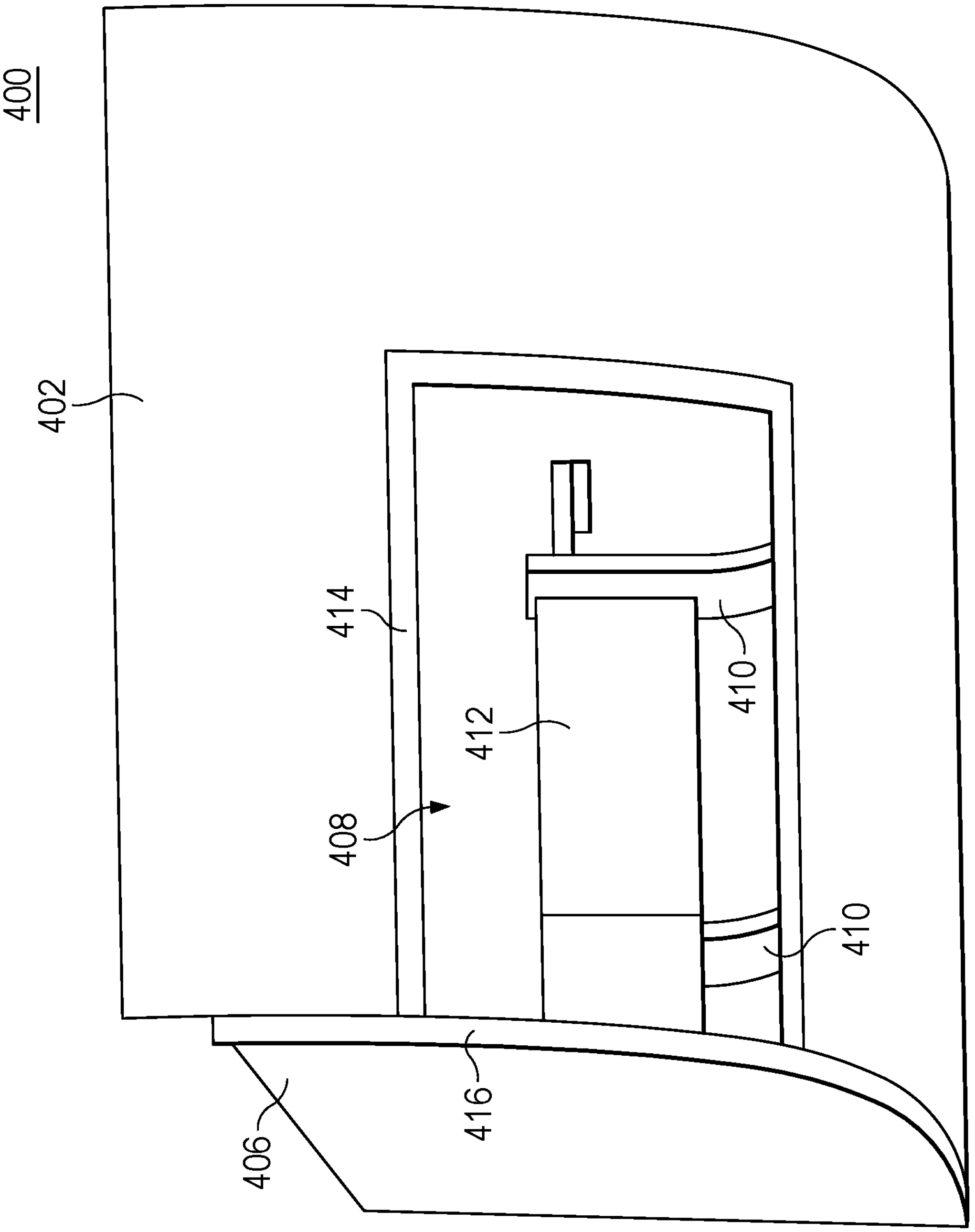
Figure 4C:
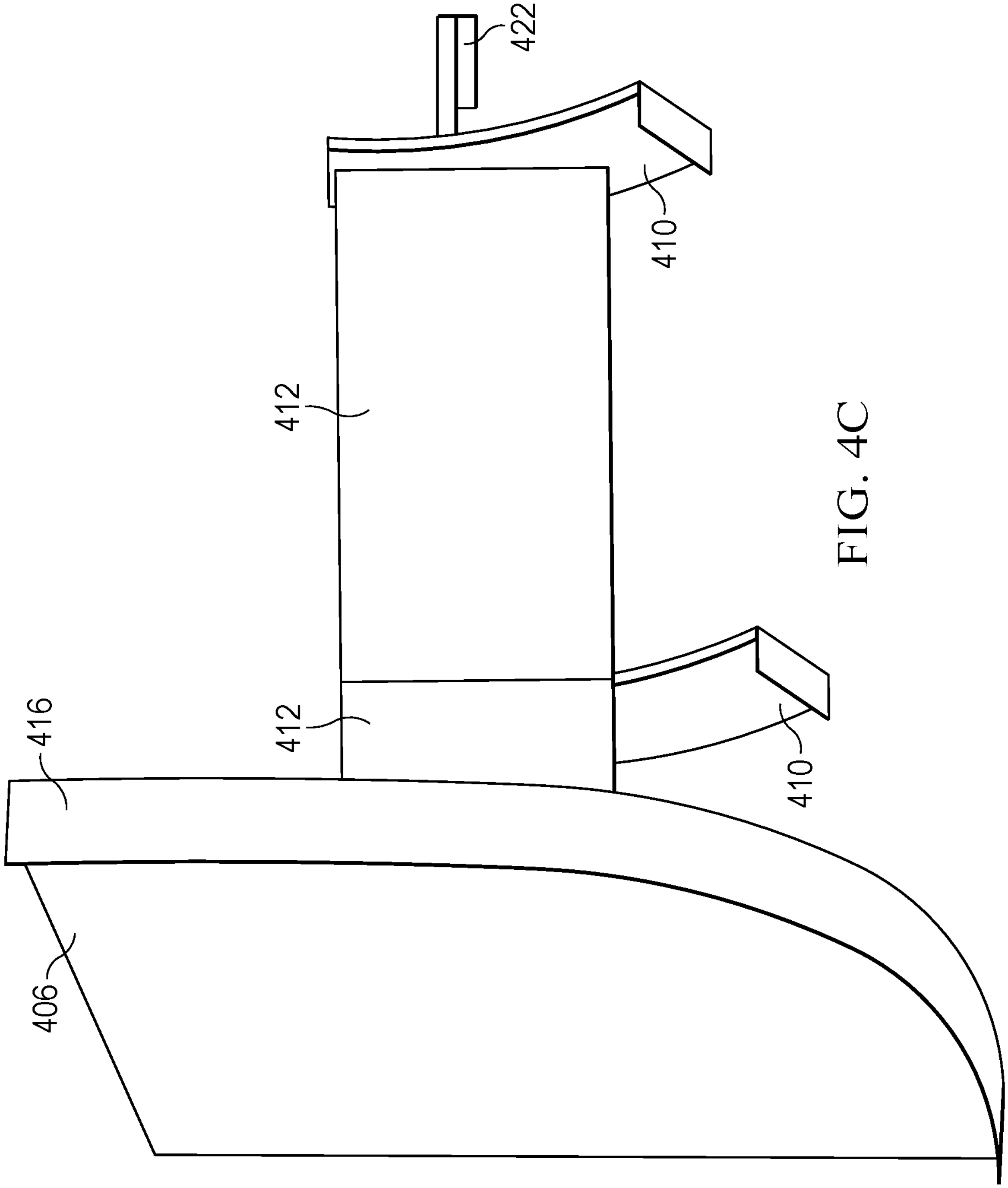

FIG. 4A-4C are perspective views of a body side section interior antenna installation arrangement according to some embodiments. FIG. 4A is a perspective view of an aircraft side section arrangement 400 with a body side RTP 404 according to some embodiments. An aircraft may have an exterior skin 402 made from one or more panels, and may, in some embodiments, be made from aluminum, titanium, an alloy, or anther metal. In other embodiments, the body panels of the exterior skin 402 may be carbon fiber, fiberglass or another composite. The exterior skin 402 may be attached to one or more supports 406 such as bulkheads, formers, or the like, that provide shape and support for the exterior skin 402. Additionally, the body side RTP 404 may be formed with edge portions and body portions as discussed above.

A body side RTP 404 may be disposed in an opening in the exterior skin 420 and may attached to the exterior skin 402, one or more supports, to other RTPs, or to other aircraft elements. The body side RTP 404 may be formed from a radio transmissive material, and may, in some embodiments, have one or more access openings or the like. The body side RTP 404 may be attached to a flange or recessed edge in the exterior skin, and may be attached via removable fasteners such as screws, bolts, an adhesive, or the like.

FIG. 4B is a perspective view of an aircraft side section arrangement 400 with body side RTP 404 removed to expose one or more mounting plates 412 according to some embodiments. The exterior skin 402 may have an opening that provides access to a body side antenna cavity 408 with one or more mounting plates 412 disposed therein. The exterior skin 402 elements may have a recessed flange around the body side opening so that the body side RTP 404 sits flush with the exterior skin 402 when installed. Additionally, the flange 414 supports the edges of the body side RTP 404 to strengthen the body side RTP 404. Additionally, a support 406 may have an edge flange 416 that provides a surface for attachment and support of the body side RTP 404. In some embodiments, the edge flange 416 has a face that is substantially out of plane with the main surface of the support 406 so that the support 406 extends transversely across the aircraft, while the main face of the edge flange 416 extends substantially longitudinally down the length of the aircraft.

The mounting plates 412 are arranged so that antennas mounted in the mounting plate 412 can transmit through the body side opening to take advantage of the radio transmissiveness of the body side RTP 404. The mounting plates 412 may, in some embodiments, have an end attached to a first support 306, such as a bulkhead, and may be further braced or secured by one or more second supports 410. However, the attachment of the mounting plates 412 is not limited to such an arrangement, as the mounting plates 412 may be affixed or attached to the aircraft by other arrangements of supports 406, 410.

Additionally, while not shown, in some embodiments, the mounting plates 412 may have antenna mounting areas, wiring holes, supplemental openings, removable sub-plates, or the like, as discussed above. In some embodiments, the mounting plates 412 are removably attached to the aircraft so that the mounting plates 412 may be removed for access to the mounted antennas, for changing or servicing the antennas, the like. In some embodiments, the antennas in the body side antenna cavity 408 may be directional antennas, such as survey radar or laser antennas or transceivers, weather radar, laser altimeters, visual imaging systems, or the like, where the antennas may transmit downward or toward the side of the aircraft.

FIGS. 4C-4C is a perspective view of an aircraft side section arrangement 400 with body side RTP removed to expose one or more mounting plates 412 according to some embodiments. In some embodiments, the mounting plate 412 may include a first mounting plate 412 and one or more other mounting plates. The first mounting plate 412 may be attached to the second supports 410, and may be braced by one or more braces 422, brackets, additional supports, or the like. The one or more of the braces 422 may act as a second mounting plate while also bracing or longitudinally supporting the first mounting plate 412 to ensure that the first mounting plate 412 is rigidly secured to the aircraft, and to provide additional mounting area for antennas. The braces 422 may also connect to the first support 406 or second supports 410 stiffen the structure, and provide additional points for attachment of the body side RTP.

Figure 5:
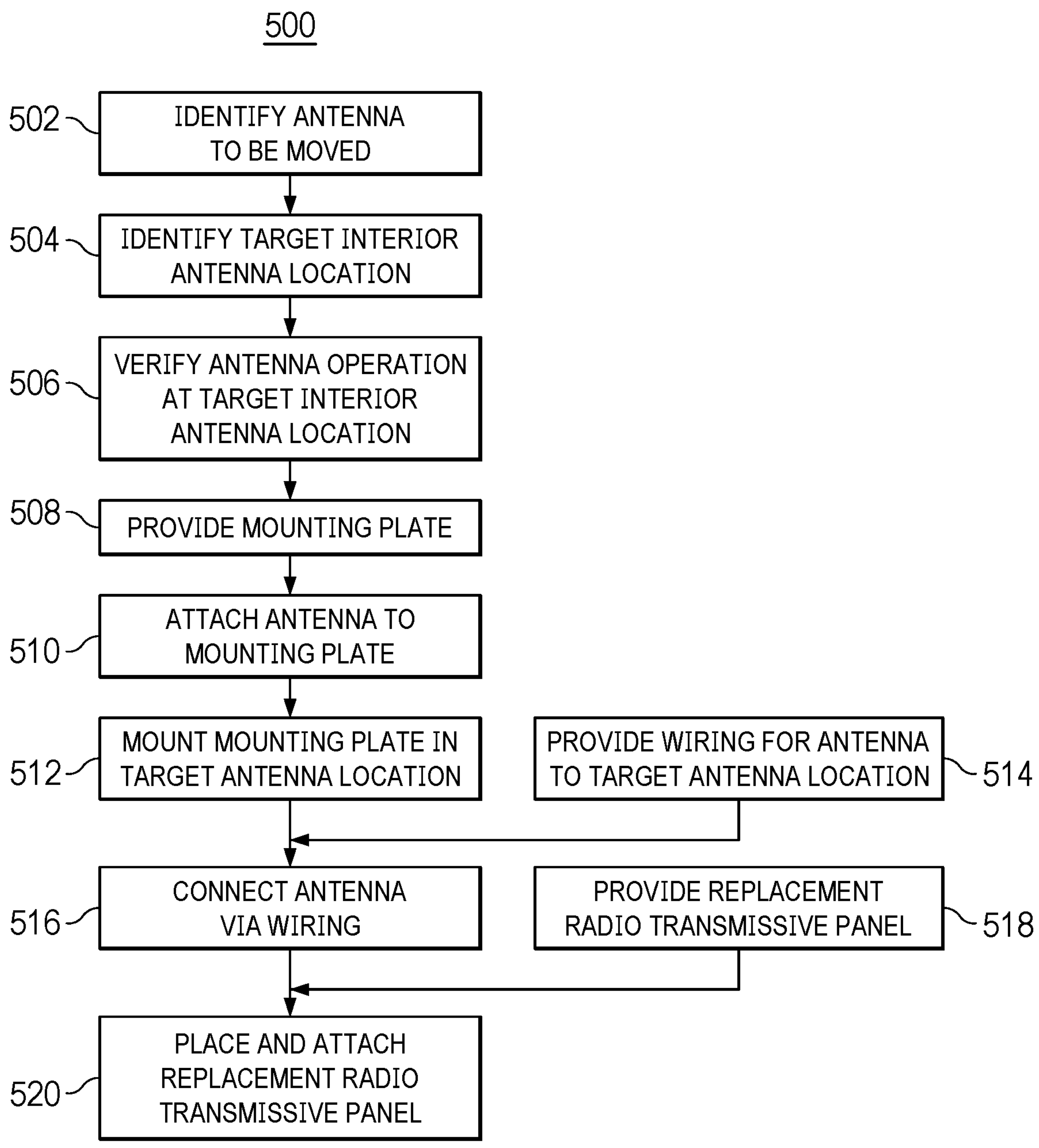
FIG. 5 is a flow diagram illustrating a method for providing an integrated antenna according to some embodiments.

FIG. 5 is a flow diagram illustrating a method 500 for providing an integrated antenna according to some embodiments. In block 502, an antenna to be moved may be identified. The antenna to be moved may be an identified or target antenna to be moved from an exterior location, or to be moved to an interior antenna location. In some embodiments, one or more antennas that are installed externally on an aircraft other vehicle may be identified for reinstallation in an internal antenna cavity. Each external antenna may be identified for relocation into the internal antenna cavity, or a particular antenna may be identified for relocation based on the value of the associated equipment, the potential need to replacement or upgrade of the antenna, the desire to limit the observability of a particular antenna, or another consideration. In some embodiments, an antenna may be identified to replace an antenna already installed in an internal cavity. In some embodiments, the new antenna may be identified for replacement of the existing antenna as an upgrade or replacement.

In block 504, a target interior antenna location is identified. In some embodiments, the target interior antenna location may be a location within an aircraft OML, for example, behind an exterior skin, body panel, fairing, or the like. In other embodiments, the target interior antenna location may be an existing antenna cavity, and identifying the target interior antenna location may be associated with upgrading or changing an existing antenna in the antenna cavity. The target interior antenna location may be identified based on a volume of space available for antenna mounting, the availability of braces or supports for providing or attaching a mounting plate, the ability to replace an exterior panel with an RTP, the usable transmission window though an RTP of the target antenna location, the types of antenna to be located in the target antenna location, or other considerations on the suitability of a target interior antenna location to the antenna.

In block 506, the antenna operation at the target interior antenna location is verified. In some embodiments, the viability of the target interior antenna location may be checked to ensure that a target antenna or identified antenna operates within specified parameters. For example, a radiation analysis may be performed for a proposed antenna installation to ensure acceptable transmission range for the antenna. The verification includes evaluating whether a radio transmissive panel reduces the range below an acceptable level, as well as verifying that supports, braces, bulkheads, or other metal features in the aircraft do not restrict the angles at which an antenna communicates are not limited beyond an acceptable range. Thus, verifying the operation of an antenna at a target location may include verifying that operating parameters fall within a specified range, or exceed a minimum threshold. In some embodiments, verifying the operation of an antenna at a target location includes performing a radiation analysis, verifying a range of the antenna in the target location meets a minimum threshold, verifying that the transmission angles of an antenna in the target location meets a minimum transmission angle threshold, or verifying another operation parameter of the antenna in the target location.

In block 508, a mounting plate is provided. In block 510, the antenna is attached to the mounting plate. In block 512 the mounting plate is mounted in the target antenna location. In some embodiments, providing the mounting plate may include providing a mounting plate mounted in the target antenna location, and attaching the antenna to the mounting plate may include attaching the antenna to a mounting plate that is already affixed to the target antenna location. This may be particularly useful in a process where an antenna is being upgraded by switching out the antenna for an old antenna, or for adding an antenna to an existing interior antenna location installation. In other embodiments, a sub-plate may be provided, and the antenna attached to the sub-plate, which may be attached to the mounting plate. The antenna may be attached to the sub-plate before, or after, the sub-plate is attached to the mounting plate. Thus, the antenna may be attached to a sub-plate, and the sub-plate subsequently installed on the mounting plate. Alternatively, the antenna may be mounted to a sub-plate previously attached to the mounting plate. In other embodiments, the antenna may be attached to a mounting plate, and then the mounting plate subsequently affixed to the vehicle. This may be advantageous for processes where an existing mounting plate is not already affixed in the antenna cavity, or where access to affix the antenna to a previously attached mounting plate is limited.

In block 514, wiring for the antenna to the target antenna location is provided. In some embodiments, the wiring for an antenna may be previously provided. For example, where an antenna is being updated or replaced, the existing wiring for a previously wired antenna may be sufficient, and may be reused. In other embodiments, new wiring may be provided by placing or running wiring from a related device to the antenna cavity so that an installed antenna may connect to a relevant device. For example, a communications device installed in a cockpit or data bay may have wiring to an antenna in an antenna cavity provided.

In block 516, the wiring is connected to the antenna. In some embodiments, wiring to a related device associated with an antenna may be plugged in to an antenna to provide connectivity between the antenna and the related device. For example, a weather display may be connected to a weather radar or antenna, or a communications unit may be connected to a communications antenna to provide connectivity between the weather radar display or communications device and the associated antenna. Thus, the related device may be connected to an antenna in an internal antenna cavity. In some embodiments, the wiring may be run or placed, and the antenna connected to the wiring, prior to the antenna or mounting plate being installed. For example, wiring may be placed, and connected to an antenna as part of the antenna or mounting plate installation process to permit connection of the wiring to the antenna in limited access areas.

In block 518, a replacement radio transmissive panel (replacement RTP) is provided. In some embodiments, an RTP that is an analog of an exterior panel is provided. The RTP may be analog to an exterior panel in that the RTP may have an exterior surface that is substantially the same as the exterior panel the RTP is replacing, but may be formed from a radio transparent material in contrast to the exterior panel being made from a material that is non-transmissive to radio. In some embodiments, the radio transmissive material may be tuned or selected according to the type of antenna being covered the he RTP to ensure that frequencies used by the associated antenna pass through the RTP material. For example, a material may be selected to permit effective communication of an L band antenna operating in the 1.518-1.675 GHz range, while blocking one or more other radio frequencies. However, selection of a material for the RTP may include selecting a material that is substantially transparent to all ranges of radio frequencies. Additionally, the RTP panel may be formed with an edge portion and body portion, as discussed above.

Additionally, in some embodiments, the RTP may have at least one mounting point, such as a flange or edge portion, or other features, that is analogous to a mounting point on the exterior panel being replaced, so that the RTP may be mounted using a mounting point originally used by the exterior panel being replaced.

In block 520, the replacement RTP is placed and attached over an antenna cavity. In some embodiments, the RTP is attached to the aircraft to at least partially cover the antenna cavity and enclose the antenna. The RTP may be attached using, for example, rivets, adhesives, or a removable fastener such as screws, clips, bolts, of the like, or a combination of the foregoing techniques or fasteners.

An embodiment method includes identifying a target interior antenna location in an aircraft having a first outer mold line (OML) formed by an exterior skin, verifying antenna operation, at the target interior antenna location, of a target antenna, providing a mounting plate configured to accept mounting of the target antenna, mounting the target antenna to the mounting plate, providing a replacement radio transmissive panel (RTP), wherein the replacement RTP has a first outer surface that substantially conforms to a second outer surface of an exterior panel of the exterior skin, and attaching the replacement RTP to the aircraft with the first outer surface forming a second OML with a portion of the exterior skin, wherein the second OML is substantially the same as the first OML.

In some embodiments, the method further includes identifying the target antenna, where identifying the target interior antenna location includes identifying the target interior antenna location according to the target antenna. In some embodiments, the identifying the target antenna includes identifying an antenna mounted on an exterior of the aircraft for relocation to an interior space. In some embodiments, identifying the target antenna includes identifying an antenna mounted in an antenna cavity for replacement with the target antenna. In some embodiments, the replacement RTP is formed from one or more composite layers, where each composite layer of the one or more composite layers is a radio-transmissive material. In some embodiments, the method further includes affixing the mounting plate to the aircraft in an antenna cavity associated with the target interior antenna location after mounting the target antenna to the mounting plate. In some embodiments, mounting the target antenna to the mounting plate includes mounting the target antenna to a sub-plate, and mounting the sub-plate to the mounting plate. In some embodiments, mounting the target antenna to the mounting plate includes mounting the target antenna to the mounting plate after the mounting plate is affixed to the aircraft.

An embodiment method includes identifying a target antenna for an aircraft, identifying a target interior antenna location in the aircraft according to the target antenna, verifying antenna operation, at the target interior antenna location, of the target antenna, mounting the target antenna to a mounting plate, providing a replacement radio transmissive panel (RTP), and attaching the replacement RTP to the aircraft with an exterior surface of the replacement RTP substantially maintaining an outer mold line (OML) of the aircraft, the replacement RTP at least partially covering the target antenna and the mounting plate after the mounting plate is affixed to the aircraft in an antenna cavity associated with the target interior antenna location and after the target antenna is mounted to the mounting plate.

In some embodiments, the replacement RTP is formed from one or more composite layers, where each composite layer of the one or more composite layers is a radio-transmissive composite material that is selected from a group consisting of an aramid, quartz glass, and fiberglass. In some embodiments, the replacement RTP has an edge portion at least partially bounding a body portion, where the body portion has a radio transmissive stiffening element and is free of metal features, where the body portion is thicker than the edge portion. In some embodiments, identifying the target antenna includes identifying at least one of an antenna mounted on an exterior of the aircraft for relocation to an interior space or an antenna mounted in an antenna cavity for replacement with the target antenna. In some embodiments, verifying the antenna operation of the target antenna includes at least one performing a radiation analysis, verifying a range of an antenna in the target interior antenna location meets a minimum threshold, or verifying that transmission angles of an antenna in the target interior antenna location meets a minimum transmission angle threshold. In some embodiments, the mounting plate is attached at a first end to a first support, and is attached at a second end to a second support. the replacement RTP is one of a stabilizer RTP, an underbody RTP or a body side RTP.

An embodiment apparatus includes a mounting plate affixed in an antenna cavity of an aircraft, where the mounting plate is connected to at least two supports of the aircraft, and is recessed from an exterior skin of the aircraft, a first antenna disposed in the antenna cavity and removably mounted to the mounting plate, and a replacement radio transmissive panel (RTP), where the replacement RTP includes one or more composite layers, where each composite layer of the one or more composite layers is a radio-transmissive material, where the replacement RTP is attached to the aircraft with an first outer surface of the replacement RTP substantially conforms to a second outer surface of the exterior skin of the aircraft, where at least a portion of the exterior skin of the aircraft adjacent to the replacement RTP includes a material that is non-transmissive to radio, where the replacement RTP at least partially encloses the antenna cavity.

In some embodiments, the first antenna is an aerodynamic external antenna. In some embodiments, the replacement RTP is one of a stabilizer RTP, an underbody RTP or a body side RTP. In some embodiments, the mounting plate includes a removable sub-plate, and where the first antenna is removably affixed to the sub-plate. In some embodiments, the apparatus further includes a second antenna that is a satellite communications antenna and that is removably mounted to the mounting plate separate from the first antenna, where the first antenna is a type of antenna different than a satellite communications antenna.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

identifying a target interior antenna location in an aircraft having a first outer mold line (OML) formed by an exterior skin;

verifying antenna operation, at the target interior antenna location, of a target antenna, wherein the verifying the antenna operation of the target antenna comprises at least one performing a radiation analysis, verifying a range of an antenna in the target interior antenna location meets a minimum threshold, or verifying that transmission angles of an antenna in the target interior antenna location meets a minimum transmission angle threshold;

providing a mounting plate configured to accept mounting of the target antenna;

mounting the target antenna to the mounting plate;

providing a replacement radio transmissive panel (RTP), wherein the replacement RTP has a first outer surface that substantially conforms to a second outer surface of an exterior panel of the exterior skin; and attaching the replacement RTP to the aircraft with the first outer surface forming a second OML with a portion of the exterior skin, wherein the second OML is substantially the same as the first OML.

2. The method of claim 1, further comprising, identifying the target antenna, wherein identifying the target interior antenna location comprises identifying the target interior antenna location according to the target antenna.

3. The method of claim 2, wherein the identifying the target antenna comprises identifying an antenna mounted on an exterior of the aircraft for relocation to an interior space.

4. The method of claim 2, wherein the identifying the target antenna comprises identifying an antenna mounted in an antenna cavity for replacement with the target antenna.

5. The method of claim 1, wherein the replacement RTP is formed from one or more composite layers, wherein each composite layer of the one or more composite layers is a radio-transmissive material.

6. The method of claim 1, further comprising affixing the mounting plate to the aircraft in an antenna cavity associated with the target interior antenna location after mounting the target antenna to the mounting plate.

7. The method of claim 1, wherein the mounting the target antenna to the mounting plate comprises mounting the target antenna to a sub-plate, and mounting the sub-plate to the mounting plate.

8. The method of claim 1, wherein the mounting the target antenna to the mounting plate comprises mounting the target antenna to the mounting plate after the mounting plate is affixed to the aircraft.

9. The method of claim 1, wherein the replacement RTP has an edge portion at least partially bounding a body portion, wherein the body portion has a radio transmissive stiffening element and is free of metal features, wherein the body portion is thicker than the edge portion.

10. A method, comprising:

identifying a target antenna for an aircraft;

identifying a target interior antenna location in the aircraft according to the target antenna;

verifying antenna operation, at the target interior antenna location, of the target antenna;

mounting the target antenna to a mounting plate;

providing a replacement radio transmissive panel (RTP), wherein the replacement RTP has an edge portion at least partially bounding a body portion, wherein the body portion has a radio transmissive stiffening element and is free of metal features, wherein the body portion is thicker than the edge portion; and attaching the replacement RTP to the aircraft with an exterior surface of the replacement RTP substantially maintaining an outer mold line (OML) of the aircraft, the replacement RTP at least partially covering the target antenna and the mounting plate after the mounting plate is affixed to the aircraft in an antenna cavity associated with the target interior antenna location and after the target antenna is mounted to the mounting plate.

11. The method of claim 10, wherein the replacement RTP is formed from one or more composite layers, wherein each composite layer of the one or more composite layers is a radio-transmissive composite material that is selected from a group consisting of an aramid, quartz glass, and fiberglass.

12. The method of claim 10, wherein the identifying the target antenna comprises identifying at least one of an antenna mounted on an exterior of the aircraft for relocation to an interior space or an antenna mounted in an antenna cavity for replacement with the target antenna.

13. The method of claim 10, wherein the verifying the antenna operation of the target antenna comprises at least one performing a radiation analysis, verifying a range of an antenna in the target interior antenna location meets a minimum threshold, or verifying that transmission angles of an antenna in the target interior antenna location meets a minimum transmission angle threshold.

14. The method of claim 10, wherein the mounting plate is attached at a first end to a first support, and is attached at a second end to a second support.

15. The method of claim 10, wherein the replacement RTP is one of a stabilizer RTP, an underbody RTP or a body side RTP.

16. An apparatus, comprising:

a mounting plate affixed in an antenna cavity of an aircraft, wherein the mounting plate is connected to at least two supports of the aircraft, and is recessed from an exterior skin of the aircraft;

a first antenna disposed in the antenna cavity and removably mounted to the mounting plate; and a replacement radio transmissive panel (RTP), wherein the replacement RTP comprises one or more composite layers, wherein each composite layer of the one or more composite layers is a radio-transmissive material, wherein the replacement RTP is attached to the aircraft with a first outer surface of the replacement RTP substantially conforms to a second outer surface of the exterior skin of the aircraft, wherein at least a portion of the exterior skin of the aircraft adjacent to the replacement RTP comprises a material that is non-transmissive to radio, wherein the replacement RTP at least partially encloses the antenna cavity.

17. The apparatus of claim 16, wherein the first antenna is an aerodynamic external antenna.

18. The apparatus of claim 16, wherein the replacement RTP is one of a stabilizer RTP, an underbody RTP or a body side RTP.

19. The apparatus of claim 16, wherein the mounting plate comprises a removable sub-plate, and wherein the first antenna is removably affixed to the sub-plate.

20. The apparatus of claim 16, further comprising a second antenna that is a satellite communications antenna and that is removably mounted to the mounting plate separate from the first antenna, wherein the first antenna is a type of antenna different than the satellite communications antenna.

* * * * *